US011886965B1

(12) United States Patent
Schwartz et al.

(10) Patent No.: US 11,886,965 B1
(45) Date of Patent: Jan. 30, 2024

(54) ARTIFICIAL-INTELLIGENCE-ASSISTED CONSTRUCTION OF INTEGRATION PROCESSES

(71) Applicant: Boomi, LP, Chesterbrook, PA (US)

(72) Inventors: Daniel Schwartz, Marlton, NJ (US); Shailendra Burman, Mountain House, CA (US); Anil Enum, Leander, TX (US); Swagata Ashwani, Nashville, TN (US)

(73) Assignee: BOOMI, LP, Chesterbrook, PA (US)

( * ) Notice: Subject to any disclaimer, the term of this patent is extended or adjusted under 35 U.S.C. 154(b) by 0 days.

(21) Appl. No.: 17/974,926

(22) Filed: Oct. 27, 2022

(51) Int. Cl.
*G06N 20/00* (2019.01)

(52) U.S. Cl.
CPC ..................... *G06N 20/00* (2019.01)

(58) Field of Classification Search
CPC ...................................................... G06N 20/00
See application file for complete search history.

(56) References Cited

U.S. PATENT DOCUMENTS

| | | | | | |
|---|---|---|---|---|---|
| 2012/0304301 | A1* | 11/2012 | Izukura | ................. | G06F 21/552 726/25 |
| 2015/0332155 | A1* | 11/2015 | Mermoud | .............. | G06N 5/048 706/12 |
| 2016/0028599 | A1* | 1/2016 | Vasseur | ................. | H04L 41/149 370/252 |
| 2016/0359690 | A1* | 12/2016 | Gravenites | .......... | G06F 3/04842 |
| 2021/0385124 | A1* | 12/2021 | Roy | .................... | H04L 43/0823 |
| 2022/0214931 | A1* | 7/2022 | Devta | ................ | H04L 41/0843 |
| 2022/0272029 | A1* | 8/2022 | Vasseur | ................... | H04L 45/24 |
| 2022/0405606 | A1* | 12/2022 | Suzuki | .................. | G06N 3/045 |

* cited by examiner

*Primary Examiner* — Joe Chacko

(74) *Attorney, Agent, or Firm* — Procopio, Cory, Hargreaves & Savitch LLP

(57) ABSTRACT

A substantial learning curve is required to construct integration processes in an integration platform. This can make it difficult for novice users to construct effective integration processes, and for expert users to construct integration processes quickly and efficiently. Accordingly, embodiments for building and operating a model to predict next steps, during construction of an integration process via a graphical user interface, are disclosed. The model may comprise a Markov chain, prediction tree, or an artificial neural network (e.g., graph neural network, recurrent neural network, etc.) or other machine-learning model that predicts a next step based on a current sequence of steps. In addition, the graphical user interface may display the suggested next steps according to a priority (e.g., defined by confidence values associated with each step).

20 Claims, 7 Drawing Sheets

ARTIFICIAL-INTELLIGENCE-ASSISTED CONSTRUCTION OF INTEGRATION PROCESSES

BACKGROUND

Field of the Invention

The embodiments described herein are generally directed to artificial intelligence (AI), and, more particularly, to the use of artificial intelligence to assist in the construction of integration processes.

Description of the Related Art

Integration platform as a service (iPaaS) enables the integration of applications and data. The iPaaS platform provided by Boomi® of Chesterbrook, Pennsylvania, enables user to construct integration processes from pre-built steps, represented by "shapes," which each has a set of configuration properties. Each step dictates how an integration process retrieves data, manipulates data, routes data, sends data, and/or the like. These steps can be connected together in endless combinations to build simple to very complex integration processes.

Recently, there has been a major push to simplify business processes. In particular, it is advantageous when workers can perform daily tasks without requiring special skills or training. This simplifies onboarding and empowers workers to be as efficient and productive as possible.

However, the technical knowledge required to construct integration processes is a barrier to simplifying (e.g., automating) the management of integration platforms. When constructing an integration process, novice users often have to go through multiple iterations of trial and error before achieving a successful implementation. In many cases, the user will have to pore through documentation and/or consult with subject-matter experts or integration experts, in order to design and develop an effective integration process. There is a large learning curve for such users.

SUMMARY

Accordingly, systems, methods, and non-transitory computer-readable media are disclosed to for AI-assisted construction of integration processes, to make it easier for users, including novice users, to build effective integration processes.

In an embodiment, a method comprises using at least one hardware processor to: during a building phase, collect data from a plurality of integration platforms managed through an integration platform as a service (iPaaS) platform, wherein the data comprise representations of a plurality of integration processes, and wherein each of the plurality of integration processes comprises at least one lineage including a sequence of steps, generate a dataset comprising representations of the lineages in the plurality of integration processes, and based on the dataset, build a model that receives a lineage as an input and predicts at least one next step to be added to the input lineage as an output; and during an operation phase, generate a graphical user interface comprising one or more inputs for constructing an integration process, receive a lineage including a sequence of steps from a user via the graphical user interface, automatically in a background, apply the model to the received lineage to predict at least one potential next step, display a selectable representation of the at least one potential next step in the graphical user interface, and in response to selection of the selectable representation of the at least one potential next step by the user, add the at least one potential next step to the sequence of steps in the received lineage.

Each of the plurality of integration platforms may be managed by a different organizational account than one or more other ones of the plurality of integration platforms.

Generating the dataset may comprise flattening each of the plurality of integration processes, comprising multiple paths, in the collected data, into a plurality of lineages that consist of a single path through the integration process.

The model may comprise a Markov chain.

The model may comprise a prediction tree that comprises branches representing all of the lineages in the dataset. The prediction tree may be stored as a trie data structure.

The model may comprise an artificial neural network. The dataset may comprise, for each lineage represented in the dataset, a feature set that comprises an adjacency matrix, representing steps and connections within a first portion of the lineage, and is labeled with at least one next step in a second portion of the lineage. For each lineage represented in the dataset, the feature set may further comprise one or more other features associated with the lineage. For each lineage represented in the dataset, the feature set may further comprise configuration properties for each step represented in the first portion of the lineage and for the at least one next step in the second portion of the lineage. The artificial neural network may be a graph neural network. The graph neural network may be a graph convolutional network. The artificial neural network may be a recurrent neural network.

The model may predict a plurality of potential next steps, and the method may further comprise using the at least one hardware processor to, during the operation phase, display selectable representations of at least a subset of two or more of the plurality of potential next steps, including the at least one potential next step, in the graphical user interface. Each of the plurality of potential next steps may be associated with a confidence value, wherein the selectable representations of the at least a subset of two or more potential next steps are displayed according to a priority that is based on the confidence values associated with the two or more potential next steps, such that each of the two or more potential next steps that is associated with a higher confidence value is displayed more prominently than any of the two or more potential next steps that is associated with a lower confidence value.

The method may further comprise using the at least one hardware processor to: during the operation phase, collect feedback from the user; and during a subsequent building phase, update the model based on the collected feedback.

The method may further comprise using the at least one hardware processor to, after the building phase and prior to the operation phase, deploy the model as a microservice within the iPaaS platform.

The graphical user interface may comprise a virtual canvas on which steps are dragged and dropped to construct the integration process.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for AI-assisted construction of integration processes. Embodiments are intended to reduce the learning curve in the management of an integration platform in multiple implementation scenarios, including application endpoints and the application programming interface (API), by offering contextual assistance through the recommendations of steps. Embodiments may also minimize users' reliance on subject-matter experts for business applications, including the APIs of those business applications, via recommendations provided by artificial intelligence that has been built on data from other users and implementations of integration processes on an iPaaS platform. AI-assisted implementations of integration processes, vetted and deduced through configuration and runtime metadata, may provide faster implementation times. In addition, embodiments enable the development of standards-based implementations of integration processes, which have been vetted for performance, efficiency, robustness, and resilience, through the training of artificial intelligence from a massive repository of real-life implementations. Such standards-based implementations of integration processes may reduce maintenance on users' integration platforms.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
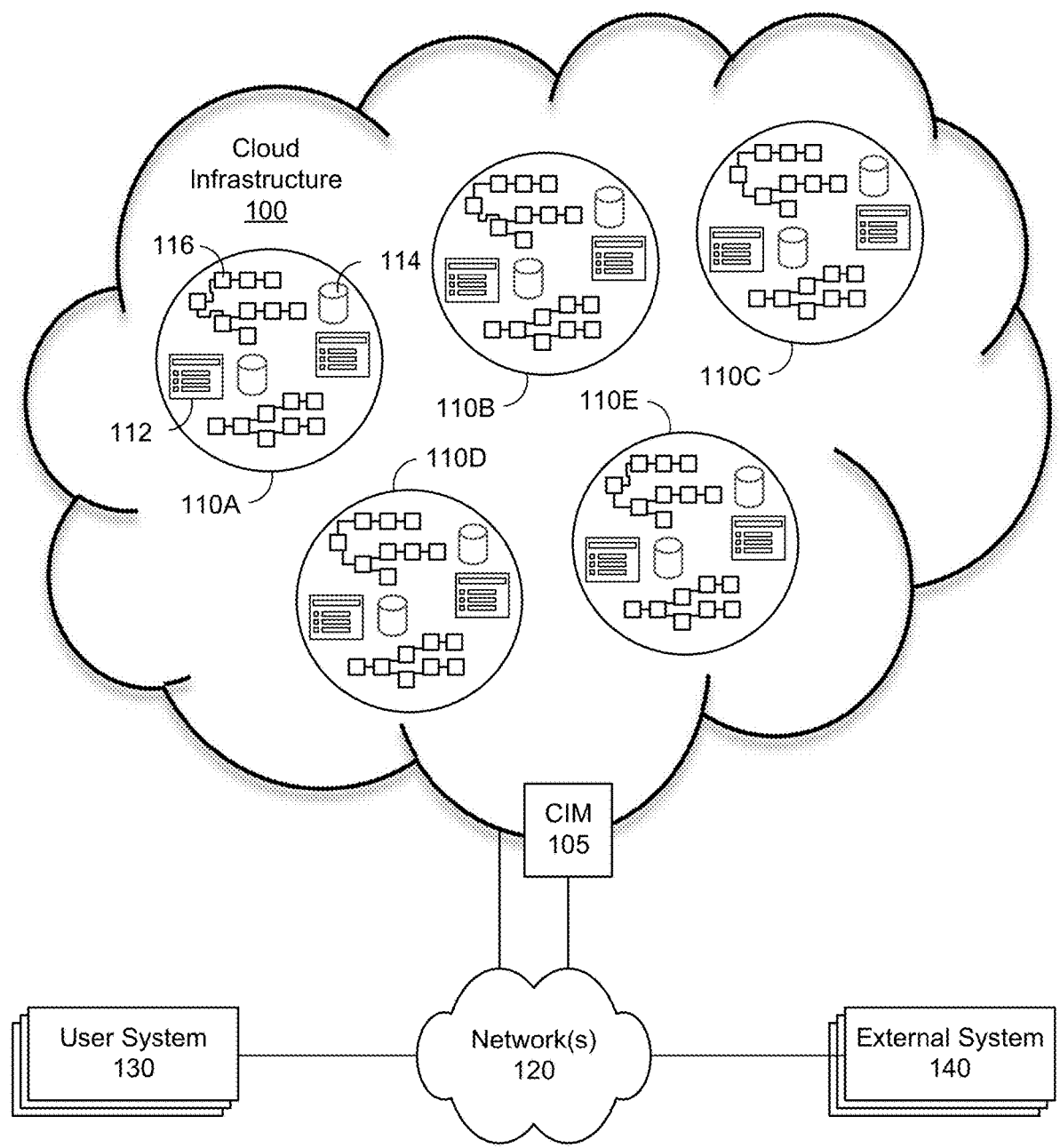
FIG. 1 illustrates an example infrastructure in which one or more of the processes described herein, may be implemented, according to an embodiment.

FIG. 1 illustrates an example infrastructure in which one or more of the disclosed processes may be implemented, according to an embodiment. The infrastructure may comprise a cloud infrastructure 100, which provides cloud computing services. Cloud infrastructure 100 may comprise a plurality of computing resources, including computer processors and data storage. These computing resources may be housed within a single data center or a plurality of data centers distributed over multiple geographic locations.

A cloud infrastructure manager (CIM) 105 may manage cloud infrastructure 100. Cloud infrastructure manager 105 may itself be hosted in cloud infrastructure 100 or may be external to cloud infrastructure 100. Cloud infrastructure manager 105 may dynamically allocate subsets of the available computing resources in cloud infrastructure 100 to each of a plurality of integration platforms 110 on demand, with upscaling and downscaling of computing resources according to real-time demand, without direct active management by a user. In other words, cloud infrastructure 100 provides integration platforms as a service (iPaaS). Each integration platform 110 may comprise one or a plurality of applications 112, one or a plurality of databases 114, and/or one or a plurality of integration processes 116.

Each application 112 may be a cloud-based application that provides one or more services or functions within a business process. Examples of an application 112 include, without limitation, a website, a web application, and a web service, including, for example, applications for Enterprise Resource Planning (ERP), customer relationship management (CRM), scheduling, data storage and backup, invoicing, accounting, payment, business intelligence, supply chain management, human resources management, marketing automation, business process management and automation, and/or the like.

Each database 114 may utilize a pool of data storage within the computing resources of cloud environment 100 to store structured and/or unstructured data. Structured data may comprise a relational database, such as MySQL™, Oracle™, IBM™, Microsoft SQL™, Access™, PostgreSQL™, and the like, which store data fields in indexed tables. Unstructured data may include, without limitation, multimedia (e.g., images, video, audio, etc.), text-heavy files, and/or the like, that are stored as files within a file system. MongoDB™ is an example of a non-relational database that can store unstructured data.

Each integration process 116 may represent the integration of data between two or more systems. An integration process 116 may comprise a series of steps that specify logic and transformation requirements for the data to be integrated. Each step may transform, route, and/or otherwise manipulate data to attain an end result from input data. For example, an initial step in an integration process 116 may retrieve data from one or more data sources, internal steps in an integration process 116 may manipulate the retrieved data in a specified manner, and a final step in an integration process 116 may send the manipulated data to one or more specified destinations. The manipulation may comprise any processing of the data, including, without limitation, analyzing, normalizing, altering, updating, and/or enhancing the data. Enhancing the data may comprise adding fields of data or metadata to the data.

Each integration process 116 may represent a business workflow or a portion of a business workflow or a transaction-level interface between two systems, and comprise, as one or more steps, software modules that process the data within integration process 116 to implement the business workflow or interface. A business workflow may comprise any myriad of workflows of which an organization may repetitively have need. For example, a business workflow may comprise, without limitation, procurement of parts or materials, manufacturing a product, selling a product, shipping a product, ordering a product, billing, managing inventory or assets, providing customer service, ensuring information security, marketing, onboarding or offboarding an employee, assessing risk, obtaining regulatory approval, reconciling data, auditing data, providing information technology (IT) services, and/or any other workflow that an organization may implement in software.

Each integration process 116 may communicate, in one or more steps, with one or more applications 112 and/or databases 114 within the same integration platform 110 and/or a different integration platform 110, and/or with one or more applications and/or databases within an external system 140. For example, a step in integration process 116 may interact with (e.g., retrieve data from or store data to) a database 114 within the same or a different integration platform 110, interact with (e.g., receive data from or send data to) an application 112 within the same or a different integration platform 110, and/or interact with (e.g., receive data from or send data to) an external system 140 via network(s) 120.

Cloud infrastructure 100 may be communicatively connected to one or more networks 120, which may include the Internet. Thus, one or a plurality of user systems 130 and/or one or a plurality of external systems 140 may communicate with cloud infrastructure 100, including with cloud infrastructure manager 105 and/or individual integration platforms 110, via network(s) 120, using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols.

While cloud infrastructure 100 is illustrated as being connected to various systems through a single set of network(s) 120, it should be understood that cloud infrastructure 100 may be connected to the various systems via different sets of one or more networks. For example, cloud infrastructure 100 may be connected to a subset of user systems 130 and/or external systems 140 via the Internet, but may be connected to one or more other user systems 130 and/or external systems 140 via an intranet. Furthermore, while only a single cloud infrastructure 100, several integration platforms 110, and a few user systems 130 and external systems 140 are illustrated, it should be understood that the infrastructure may comprise any number of cloud infrastructures 100, integration platforms 110, user systems 130, and external systems 140.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines (ATMs), and/or the like. Each user system 130 may be used to access an organizational account with cloud infrastructure 100, according to one or more roles or permissions associated with a user of user system 130, who may be identified via authentication. The organizational account may be associated with an organization and used to configure one or more integration platforms 110 for the organization via a graphical user interface provided by cloud infrastructure manager 105. Alternatively, user system 130 may be similarly used to access an organizational account with an external system 140 that interfaces with cloud infrastructure manager 105, to configure one or more integration platforms 110 for the organization via a graphical user interface of external system 140. In this case, cloud infrastructure manager 105 may implement a web service, and external system 140 may interface with the web service via an application programming interface (API). Thus, it should be understood that as used herein and unless stated otherwise, any reference to a "graphical user interface" is a reference to any graphical user interface that is utilized to configure the integration platform(s) 110 associated with an organization, regardless of whether the graphical user interface is generated by cloud infrastructure manager 105, an external system 140, or in some other manner.

In an embodiment, integration platforms 110 are designed and/or tested within cloud infrastructure 100. For example, an administrator of an organization may authenticate with cloud infrastructure 100 to access one or more tools for designing and/or testing an integration platform within a multi-tenant environment. However, once an integration platform 110 has been constructed, the integration platform 110 may be deployed from cloud infrastructure 100, as a middleware platform, to any production system anywhere in the world. That production system may be cloud-based (e.g., within cloud infrastructure 100 or another cloud) or non-cloud-based (e.g., utilizing dedicated servers) and may be remote or local to the organization. In other words, design-time for an integration platform 110 may occur in the cloud, whereas runtime for the integration platform 110 may be hosted anywhere (e.g., iPaaS), according to the particular organization's implementation.

2. Example Processing Device

Figure 2:
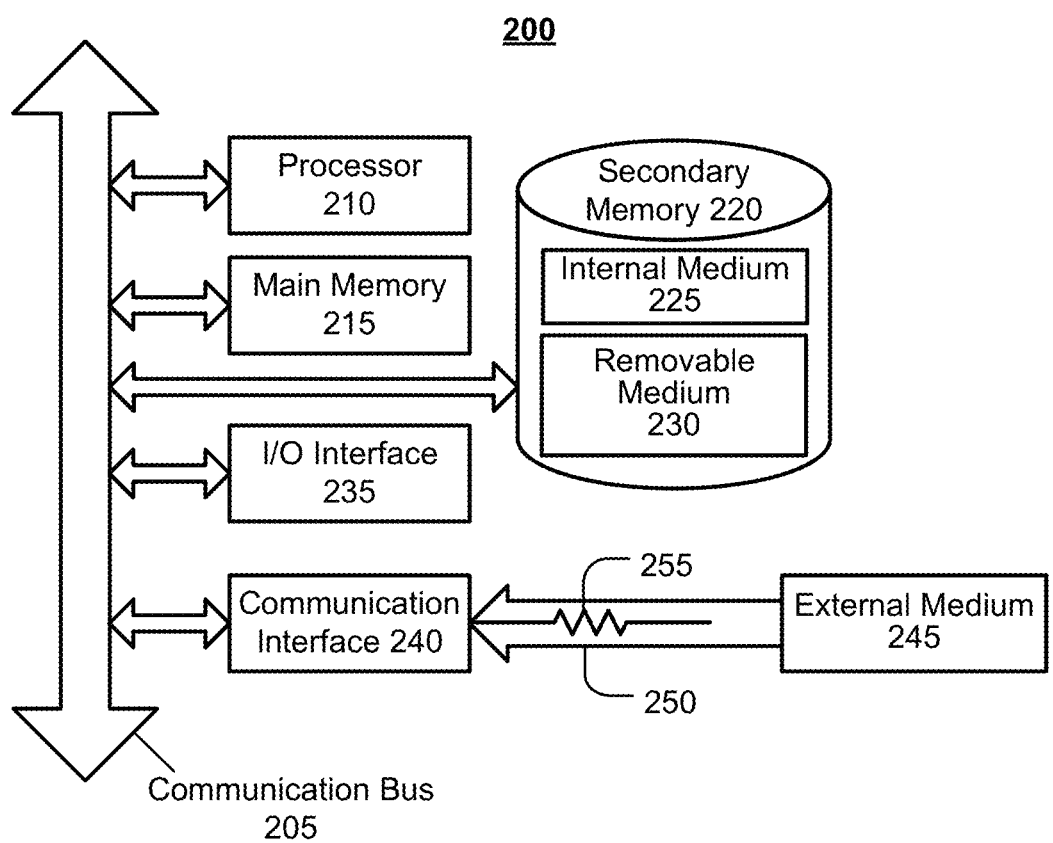
FIG. 2 illustrates an example processing system, by which one or more of the processes described herein may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute any of the software) described herein, and may represent components of cloud infrastructure 100 (e.g., each of a plurality of servers that form cloud infrastructure 100), user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 may be connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, messaging bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, event-driven architecture (EDA), publish-and-subscribe (pub-sub), a data mesh, singleton, point-to-point, remote procedure call (RPC) and its derivatives, inter-process communication (IPC), and/or the like, including any other current or future data, messaging, or network technology (e.g., quantum networking).

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as any of the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

3. Building Phase

Figure 3A:
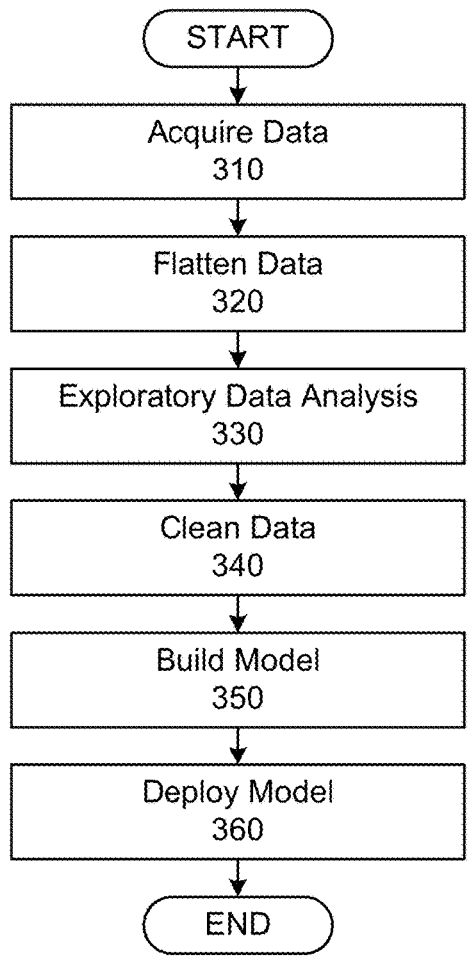
FIGS. 3A and 3B illustrate an example process for building a model to suggest a next step during construction of an integration process, according to an embodiment.

FIG. 3A illustrates an example process 300 for building a model to suggest a next step during construction of an integration process 116, according to an embodiment. Process 300 may be implemented as software that is executed in cloud infrastructure 100 or by an external system 140. While process 300 is illustrated with a certain arrangement and ordering of subprocesses, process 300 may be implemented with fewer, more, or different subprocesses and a different arrangement and/or ordering of subprocesses. Furthermore, any subprocess, which does not depend on the completion of another subprocess, may be executed before, after, or in parallel with that other independent subprocess, even if the subprocesses are described or illustrated in a particular order.

In subprocess 310, data is acquired. In particular, the data may be collected from a plurality of integration platforms 110 managed through an iPaaS platform. The data may comprise representations of a plurality of integration processes 116 that have been implemented by users of the plurality of integration platforms 110. In other words, the data are crowd-sourced. For example, the Boomi® iPaaS platform provides a massive repository of customer integration processes 116, spanning numerous integration scenarios, from which to draw data. The data may also comprise metadata associated with each of the plurality of integration processes 116 that is represented in the data.

Each integration process that is represented in the data may comprise at least one lineage. In some cases, an integration process 116 may comprise a decision step or other type of step that results in the integration process 116 branching into a plurality of paths. It should be understood that an integration process 116 may comprise multiple branches, such that there may be numerous possible paths through the integration process 116. As used herein, the term "lineage" refers to at least one of these paths through the integration process 116. In an embodiment, each lineage consists of the sequence of steps in a single path through the integration process 116.

In subprocess 320, the data are flattened. During this flattening, each of the integration processes 116, in the data, that comprises a plurality of paths may be flattened into a plurality of lineages, in which each lineage consists of a single one of the plurality of paths. For example, each integration process 116 that comprises multiple branching paths may be divided into a plurality of lineages that each consists of a single path from a starting step to an ending step of the integration process 116. It should be understood that integration processes 116 that consist of a single path do not need to be flattened in subprocess 320, and therefore, can be skipped during the flattening.

Figure 4:
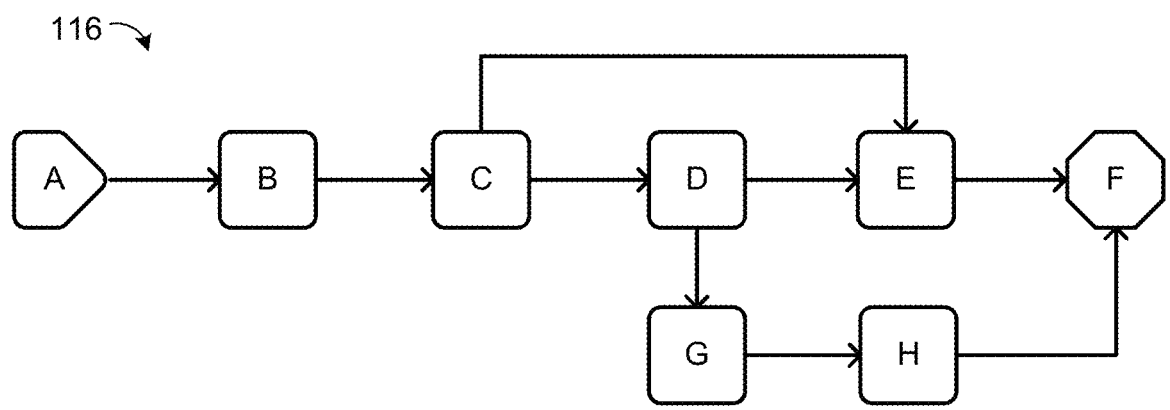
FIG. 4 illustrates a simple integration process, according to an example.

FIG. 4 illustrates a simple integration process 116, according to an example. As illustrated, this integration process 116 comprises steps A, B, C, D, E, F, G, and H, with step A representing a starting step, step F representing an ending step, and steps C and D representing branching (e.g., decision) steps. In an embodiment, such an integration process 116 may be flattened into at least three lineages:

(1) A→B C→D→E→F;
(2) A→B→C→E→F; and
(3) A→B→C→D→G→H→F.

In an embodiment, each path may comprise both a starting step and an ending step of the integration process 116 from which it is derived.

In an alternative embodiment, in addition to lineages with starting and ending steps, an integration process 116 may be flattened into lineages that consist of sub-paths between a starting and ending step. For example, using the example in FIG. 4, the integration process 116 could also produce lineages in addition to (1)-(3) above, including, for example, A→B, A→B→C, A→B→C→D, A→B→C→D→E, A→B→C→E, A→B→C→D→G, A→B→C→D→G→H, B→C, B→C→D, B→C→D→E, B→C→D→E→F, C→E, C→E→F, C→D, C→D→G, and so on and so forth. More generally, subprocess 320 could flatten an integration process 116, whether consisting of a single path or comprising multiple paths, into any set of paths or sub-paths that comprise two or more steps.

Each lineage may comprise a representation of the sequence of steps, for example, as a sequence of step identifiers. In addition, each lineage and/or each step in each lineage may be associated in the data with metadata. For example, each integration process 116 in the data may be associated with metadata and/or metadata may be derived for each integration process 116, and this metadata may be associated with each lineage that is derived from the integration process 116 and/or to which the metadata relates. In addition, the data may comprise the configuration properties of each step in each integration process 116. In this case, the each step in each lineage may be associated with its respective configuration properties.

The metadata, associated with each lineage, may include, without limitation, a process identifier identifying the integration process 116 from which the lineage was derived, information about input data that is input to the integration process 116, information about output data that is output from the integration process 116, a measure of total execution time of the integration process 116, information about the environment in which integration process 116 is executed, the operating system on which integration process 116 is executed, the version of the operating system, whether the integration process 116 is manually executed or executed according to a schedule, and/or the like.

The metadata, associated with each lineage in the data, may also comprise business metadata, integration metadata, resource metadata, and/or the like. Business metadata may comprise an identifier of the industry (e.g., business-to-business, healthcare, education, etc.) of the organization managing the integration platform 110 on which the integration process 116 was implemented, the use case for which the integration platform 110 was implemented (e.g., Salesforce™ object for which the lineage is collecting data, what objects the lineage is manipulating, the external systems 140 to which the lineage is connecting, etc.), the intent or business objective or problem being solved by the integration process 116, and/or the like. Integration metadata may comprise a measure of complexity (e.g., number of steps in the lineage, number of certain types of steps, such as connectors, in the lineage, whether or not an internal process is called by the lineage, etc.), an integration pattern, the amount of data that is gathered by the lineage, a resource utilization required by the lineage, and/or the like. Resource metadata may comprise rules, representing best practices, that link the lineage to a standards-based template (e.g., in a library maintained by the iPaaS platform), prohibit certain steps or patterns of steps to be included in the lineage, prohibit certain resources from being utilized or connected to by the lineage, and/or the like.

In an embodiment, each step in a lineage is associated with metadata, such as configuration properties of the step. For example, each step in the lineage may be associated with a step identifier, an account identifier, an identifier of the prior step, a type of the prior step, an identifier of the next step, a type of the next step, a type of connector represented by the step, a type of action configured for the step (e.g., get, send, execute, upsert, etc.), an end point of the connector represented by the step, an object of the connector represented by the step, the input(s) to the step, the type of input to the step, the output(s) from the step, the type of output from the step, authentication details, and/or the like. Notably, not all steps in a lineage will necessarily have values for every metadata field.

In subprocess 330, an exploratory data analysis may be performed on the flattened data, comprising representations of the lineages and their associated metadata. Exploratory data analysis may comprise analyzing a distribution of the data (e.g., as histograms, bar plots, etc.), identifying patterns, checking for missing values, identifying imbalances, identifying outliers, identifying duplicate data, identifying essential variables, identifying non-essential variables, checking assumptions, and/or the like. In general, exploratory data analysis enables an operator to determine how to clean the data and/or identify potential features to be used for a machine-learning model.

In subprocess 340, the flattened data is cleaned to produce a clean dataset. This cleaning may be based on the exploratory data analysis in subprocess 330. For example, cleaning may comprise removing lineages with missing values, removing lineages with outlying values, removing duplicate data, removing non-essential variables, fixing imbalances (e.g., by discarding data and/or synthesizing data), and/or the like. In an embodiment, cleaning comprises removing duplicate lineages, removing lineages with less than a certain number of steps (e.g., less than two steps), removing lineages with multiple start steps, removing lineages that have steps after a stop step (e.g., thereby indicating a sub-optimal lineage since no steps should occur after a stop step,), removing connector identifiers for connector steps and/or positional arguments for other types of steps, normalizing the remaining data, and/or the like.

In subprocess 350, a model is built based on the dataset, output by subprocess 340. The model may comprise any type of model, including a machine-learning model. As examples, the model may comprise a Markov chain, a compact prediction tree (CPT), a graph neural network (GNN), a recurrent neural network (RNN), or the like. Each of these types of models is discussed in greater detail elsewhere herein. Regardless of the type of model, the model is trained to accept a lineage as input, and infer or predict a next step to be added to the lineage as an output.

In an embodiment, the model may output a plurality of potential next steps. In this case, each of the plurality of potential next steps may be associated with a confidence value. For example, the model may be a classifier that outputs a vector with a confidence value for every available type (i.e., class) of step. Alternatively, the model may output a single step having the highest confidence value, a predefined number of steps having the highest confidence values, or the like. In either case, the model may also output suggested configuration properties for each step that is output.

In subprocess 360, the model, built in subprocess 350, may be deployed. For example, the model may be deployed to cloud infrastructure 100, an external system 140, or other system to operate during the design of an integration process 116 by a user (e.g., administrator) of an integration platform 110. In particular, as a user constructs an integration process 116 on a virtual canvas in a graphical user interface, the model may be applied to the currently constructed lineage, comprising a sequence of one or more steps, to predict one or more potential next steps. The execution of the model may be applied automatically in the background (i.e., without user involvement and visibility), or may be applied in response to a user operation via the graphical user interface.

At least a subset of the potential next step(s), predicted by the model, may be suggested to the user in the graphical user interface. For example, all of the potential next step(s) may be suggested, a predefined number of the potential next step(s) having the highest confidence values may be suggested, all of the potential next step(s) having confidence values that exceed a threshold may be suggested, or the like. In an embodiment, if a plurality of next steps are suggested, they may be prioritized according to their respective confidence values. In this case, the steps may be ordered, in terms of prominence within the graphical user interface, from highest confidence value to lowest confidence value. An example of such a graphical user interface is described elsewhere herein.

In an embodiment, the model may be deployed in subprocess 360 as a microservice. In this case, the model may be wrapped in a container with an API that is exposed to other services. Thus, another service may use the API to supply an input to the model (e.g., a current lineage with associated metadata) and receive the output of the model (e.g., one or more potential next steps). Instances of the microservice may be operated in cloud infrastructure 100, and dynamically and elastically scaled up and down as needed to satisfy demand for the microservice.

Figure 3B:
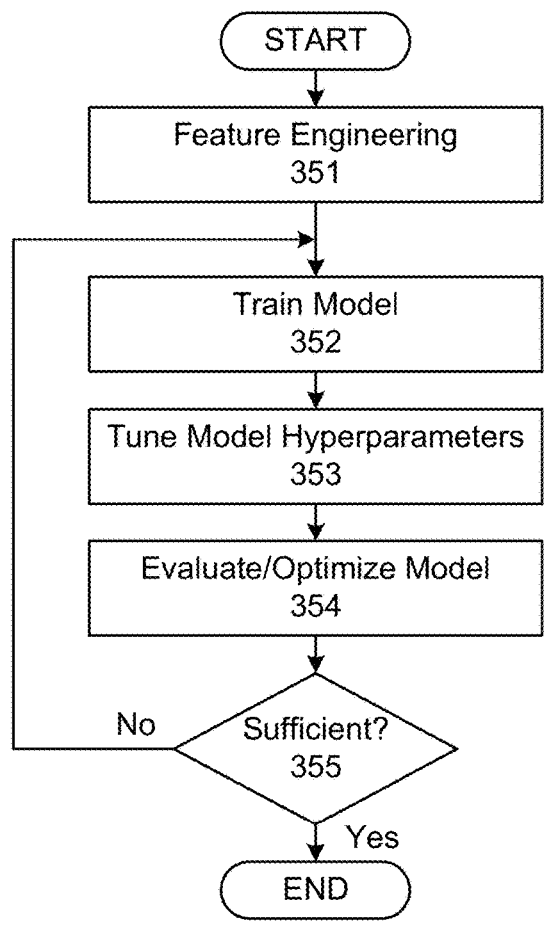

FIG. 3B illustrates an example of subprocess 350 in process 300, according to an embodiment which utilizes machine learning. For example, this embodiment of subprocess 350 may be used to train a GNN, RNN, or other machine-learning model. While subprocess 350 is illustrated with a certain arrangement and ordering of subprocesses, subprocess 350 may be implemented with fewer, more, or different subprocesses and a different arrangement and/or ordering of subprocesses. Furthermore, any subprocess, which does not depend on the completion of another subprocess, may be executed before, after, or in parallel with that other independent subprocess, even if the subprocesses are described or illustrated in a particular order.

In subprocess 351, feature engineering may be performed to convert the dataset, output by subprocess 340, into labeled feature sets, such as feature vectors, that can be used for supervised learning. The features may be extracted from the data, as cleaned in subprocess 340, based on the exploratory data analysis in subprocess 330. A feature set may be derived from each lineage, with its associated metadata, that remains in the data after subprocess 340. For example, a feature set may comprise a representation of a first portion of the lineage, and be labeled with a subsequent second portion of the lineage. As an example, given the lineage A→B→C→D→E→F in the data, the corresponding feature set may comprise the lineage A→B→C→D→E and be labeled with a target (i.e., ground-truth value) of F. It should be understood that a plurality of feature sets could be derived from a single lineage. For example, another feature set may comprise the lineage A→B→C→D and be labeled with a target of E or E→F, another feature set may comprise the lineage A→B→C and be labeled with a target of D, D→E, or D→E→F, and so on and so forth. In addition, a feature set may comprise all or a subset of the metadata associated with the lineage in the feature set and/or data derived from the metadata associated with the lineage in the feature set. The output of subprocess 351 is a training dataset, comprising labeled feature sets, represented, for example, as labeled feature vectors. The output of subprocess 340 may also comprise a validation dataset and/or a testing dataset.

In subprocess 352, the model is trained using the training dataset. In particular, weights of a machine-learning model, such as a GNN or RNN, may be updated over a plurality of epochs to minimize the error between the output of the model, given the feature sets, and the targets with which those feature sets are labeled. This is an example of supervised learning. However, it should be understood that other forms of machine learning, including semi-supervised or unsupervised learning may be used, depending on the particular model and/or objectives.

In subprocess 352, the hyperparameters of the model may be tuned to identify the ideal architecture for the model, using the validation dataset. In particular, the hyperparameter space may be searched for the optimum values of the hyperparameters. It should be understood that the specific hyperparameters to be tuned will depend on the model that is chosen. Any method for hyperparameter tuning may be utilized in subprocess 352, including, for example, grid search, random search, Bayesian optimization, or the like. The output of subprocess 352 is a set of optimal hyperparameters to be used for the model. In an alternative embodiment, subprocesses 352 and 353 may be combined, such that the optimal hyperparameters are learned while the model is trained.

In subprocess 354, the model is evaluated and/or optimized, using the testing dataset. In particular, the model may be applied to the testing dataset to evaluate the performance of the model. The performance may be evaluated according to the accuracy of the model (e.g., percentage of correct predictions relative to total predictions), the precision of the model, the recall of the model, the F1 score of the model, the Area Under the Curve (AUC) of the model, and/or the like. In a particular implementation, an accuracy of 73% was attained by the model.

In subprocess 355, it is determined whether or not the performance of the model is sufficient. For example, if the performance satisfies one or more criteria (e.g., the accuracy exceeds a threshold value), the performance of the model may be determined to be sufficient. In contrast, if the performance does not satisfy the one or more criteria, the performance of the model may be determined to be insufficient. If the performance of the model is determined to be sufficient (i.e., "Yes" in subprocess 355), subprocess 350 may proceed to subprocess 360. Otherwise, if the performance of the model is determined to be insufficient (i.e., "No" in subprocess 355), subprocess 350 may return to subprocess 352 to retrain the model and/or retune the hyperparameters.

It should be understood that, over time, the model may be periodically evaluated and/or maintained. Maintenance may comprise adjusting or retraining the model based on new data. The new data may be derived from feedback provided by users (e.g., via the graphical user interface) regarding the suggested next steps. This feedback may comprise the actual next step selected by a user during construction of an integration process 116. For example, assume a user utilizes the virtual canvas to construct an integration process 116, consisting of A→B→C, and the model suggests D as the next step. In this case, if the user selects E, a feature set comprising the lineage A→B→C, labeled with a target of step E, may be added to a new training dataset to be used to retrain the model. It should be understood that, once the model has been updated to operate with sufficient performance, it may be redeployed in place of the old model or deployed as a new version of the model (e.g., a new instance of a microservice).

4. Markov Chain

In an embodiment, the model that is built and deployed by process 300 may comprise a Markov chain. A Markov chain is a stochastic model that describes a sequence of possible events or transitions from one state to another state. Typically, in a Markov chain, the probability of each transition between states depends only on the current state. In particular, the Markov property states that the probability of transitioning from a first state to a second state depends solely on the first state and the time elapsed, and not on the sequence of states that preceded the first state. The Markov property renders the transitions memory-less. However, a Markov chain may be extended to calculate the probabilities of each possible next state based on the memory of prior states. For example, a Markov chain with memory or an additive Markov chain may be used.

The Markov chain may be represented as a set of nodes, representing a plurality of states, that are interconnected by edges, representing transitions between states. The Markov chain can be thought of as a sequence of directed graphs, in which each edge of graph n is labeled by the probability of transitioning from one state $X_n$ at time n to another state $X_{n+1}$ at time n+1. These probabilities may be represented by a transition matrix from time n to time n+1. Every state in the state space is represented by both a row and a column in the transition matrix. Each cell in the transition matrix contains the probability of transitioning from the state represented by the row that includes the cell to the state represented by the column that includes the cell. If the Markov chain has K possible states, the matrix will be K×K in shape, such that cell (i, j) contains the probability of transitioning from state i to state j.

Each of the plurality of states may represent a step in a lineage or a lineage comprising a sequence of two or more steps, and each transition from a first state to a second state represents the probability that the step, represented by the second state, follows the last step, represented by the first state. It should be understood that the probability may be represented as a confidence value, and that the terms "probability" and "confidence" will be used interchangeably throughout the present disclosure.

Given a current state, representing a current step or sequence of steps, the state that follows a transition from the current state with the highest confidence value may be output by the Markov chain as the potential next step. Alternatively, all states that follow a transition from the current state may be output by the Markov chain as potential next steps. In this case, the potential next steps may be prioritized in descending order of each step's confidence value, represented by the probability of the transition from the current state to the state representing that step. Thus, the Markov chain may accept a lineage, comprising a sequence of one or more steps, as an input, and predict one or more potential next steps as output.

5. Compact Prediction Tree

In an embodiment, the model that is built and deployed by process 300 may comprise a compact prediction tree (CPT). A CPT model may utilize one or more of the following data structures: a prediction tree; an inverted index; and/or a lookup table. The prediction tree stores the lineages (i.e., sequences of steps) in a trie, which is a type of search-tree data structure that allows steps to be retrieved by traversing a path down branches of the tree. The inverted index is a dictionary in which there is a key for each step in the lineages, and the value with which each key is associated is the set of lineages in which the respective step has appeared. The lookup table is a dictionary in which there is a key for each lineage, and the value with which each key is associated is the ending step in the respective lineage.

Figure 5:
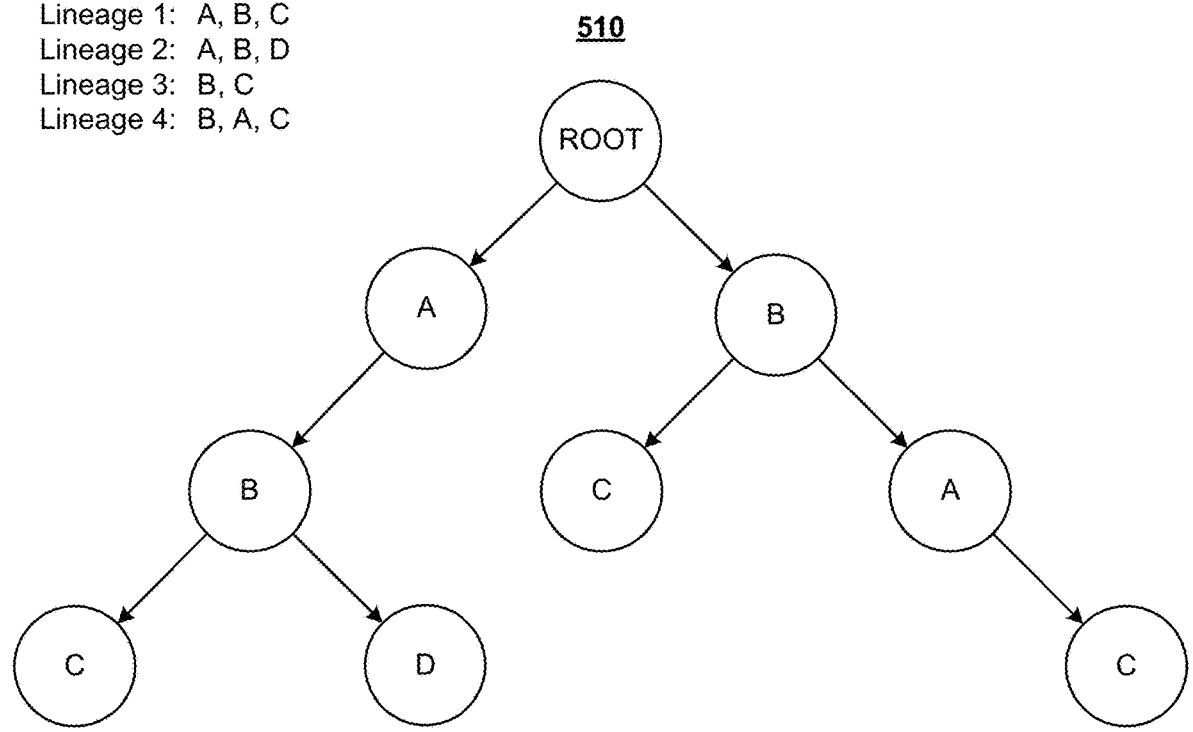
FIG. 5 illustrates a compact prediction tree model, according to an example.

To build the CPT model in a building phase, each unique lineage may be inserted into the prediction tree, a pairing may be added to the inverted index for each step and the set of lineages in which that step appears, and/or a pairing may be added to the lookup table for each lineage and the ending step in that lineage. FIG. 5 illustrates a prediction tree 510, inverted index 520, and lookup table 530, for an example of a simple CPT model that represents four lineages:

| Lineage Identifier | Lineage Value |
|---|---|
| 1 | A → B → C |
| 2 | A → B → D |
| 3 | B → C |
| 4 | B → A → C |

It should be understood that, in reality, the CPT model may represent hundreds, thousands, millions, or billions of different lineages.

In an operation phase, the CPT model may be applied to a target lineage. This target lineage may represent the current portion of an integration process 116 that a user has constructed. To apply the CPT model to the target lineage, firstly, lineages that are similar to the target lineage may be found. For example, assume that the target lineage is A→B. The lineages that are similar to this target lineage are those that contain every step in the target lineage in any order and in any position. To find the similar lineages, inverted index 520 is used to identify each lineage that contains a step of the target lineage and then compute the intersection. In the example, step A will be used as a key into inverted index 520 to retrieve the set of lineages {1, 2, 4}, and step B will be used as a key into inverted index 520 to retrieve the set or lineages {1, 2, 3, 4}. The intersection of the two retrieved sets of lineages is the set of similar lineages {1, 2, 4}.

Secondly, the consequent of each similar lineage may be found. The consequent may be defined as the first step of the similar lineage that is subsequent to the last step in the occurrence of the target lineage within the similar lineage. In the example, the consequent of Lineage 1 is C, since this is the first step of the lineage A→B→C following the occurrence of target lineage A→B. Similarly, the consequent of Lineage 2 is D, and the consequent of Lineage 4 is C.

Thirdly, the number of occurrences of each first step in the consequents may be counted, and the step with the highest number of occurrences may be predicted as the next step for the target lineage. In the example, the consequents for the similar lineages {1, 2, 4} are C, D, and C, respectively. Thus, the number of occurrences of C is two, and the number of occurrences of step D is one. Since C has the highest number of occurrences, C may be predicted as the potential next step for the target lineage. In an embodiment, C and D may both be suggested as potential next steps, but step C may be prioritized over step D, since it has a higher number of occurrences. It should be understood that, in this example, the confidence value of each potential next step is the number of occurrences of that step (or a ratio of occurrences of that step to the total number of similar lineages).

It should be understood that not all of prediction tree 510, inverted index 520, and lookup table 530 may be required. For example, in an alternative embodiment, only prediction tree 510 is used. In this case, each node, representing a step, in prediction tree 510 may store a confidence value for each of its child nodes, representing possible next steps. If a node only has one child node, the confidence value associated with that child node may be 100%. If a node has a plurality of children nodes, confidence values may be assigned to the nodes based on any criteria. The criteria may include the number of occurrences in the lineages, which may be counted as described above. For instance, node B on the left side of prediction tree 510 has two child nodes C and D. In this case, the confidence value assigned to child node C may be 67%, and the confidence value assigned to child node D may be 33% (e.g., based on node C following a node B twice and node D following a node B once in prediction tree 510). If a user has constructed a target lineage consisting of A→B, prediction tree 510 may be traversed (e.g., in a depth-first search) from the root to node A to node B. Then, C and D, represented by the child nodes of node B, may be suggested to the user. In this case, step C may be prioritized over step D in the suggestion, since step C has a higher confidence value than step D.

In this embodiment, prediction tree 510 may be trained by iterating through each lineage in the dataset, output by subprocess 340, and adding the steps in each lineage to the trie in sequence, starting from the root of the trie. Each step may be added into prediction tree 510 as a node that comprises properties of the step, which may comprise or be derived from the metadata associated with the lineage and/or step. It should be understood that sequences that are already in the trie are not duplicated. For example, when Lineage 1 (A→B→C) is added to prediction tree 510, A is added as a child node to the root, B is added as a child node to node A, and C is added as a child node to node B, to form the leftmost branch of prediction tree 510. Then, when Lineage 2 (A→B→D) is added to prediction tree 510, nodes A and B on the leftmost branch of prediction tree 510 are simply traversed without being duplicated, and D is added as a child node to node B.

In addition, each edge between a parent node and a child node, at least for parent nodes with multiple child nodes, may be associated with a confidence value, which may be determined in any manner, including any of the manners described herein. For example, the confidence value may be computed based on the number of occurrences in which the child node follows the parent node, relative to the total number of times that the parent node is followed by any child node, in the lineages of the dataset. It should be understood that this confidence value may be expressed as a ratio or percentage.

6. Graph Neural Network

In an embodiment, the model that is built and deployed by process 300 may comprise a graph neural network (GNN), which is a type of artificial neural network. A graph is a data structure consisting of two types of components: vertices and edges. Graphs are mathematical structures that can be used to analyze pair-wise relationships between objects. Typically, a graph is defined as G=(V, E), wherein V is a set of vertices and E is a set of edges between the vertices.

A graph is often represented by an adjacency matrix. If a graph has N vertices, then the adjacency matrix has a shape of N×N. A feature matrix may also be provided, which describes each of the N vertices in the graph. If each vertex has F features, then the feature matrix will have a shape of N×F. In other words, in the feature matrix, each vertex is represented by a row comprising a value for each of the F features. Alternatively, another data structure may be used to represent and store the features of each vertex.

An integration process 116 or any lineage within an integration process 116 may be represented as a graph in which the vertices are the steps in the integration process 116 or lineage and the edges are the connections between these steps. This spatial information may be represented as an adjacency matrix, which may be generated for each lineage in the dataset output by subprocess 340. In addition, each vertex, which represents a step and may also be referred to as a "node," may be associated with a set of features. Each set of features may comprise, for example, the type of step (e.g., start, message, map, etc.), the connector name (e.g., Salesforce™, Dropbox™, etc.), any metadata associated with the step, the lineage in which it appears, or the integration process 116 in which it appears (e.g., object name, account name, etc.), and/or the like.

Thus, the training dataset for the GNN may comprise, as a plurality of feature sets, a set of adjacency matrices, comprising an adjacency matrix for each lineage in the dataset, output by subprocess 340, and the associated features for each step represented in each adjacency matrix. A feature set for a lineage in the data may comprise the adjacency matrix for just a first portion of the lineage, and may be labeled with a subsequent portion of the lineage as the target or ground-truth for the feature set. In an embodiment, each target consists of a single step. For example, for Lineage 1 (A→B→C), the feature set may comprise an adjacency matrix for A and B, with associated features for each of A and B, and the target may comprise C. In an alternative embodiment, the target could comprise a plurality of steps, including potentially all steps that are subsequent to the first portion of the lineage in the feature set. For example, for a lineage of A→B→C→D, the feature set may comprise an adjacency matrix for A and B, with associated features for each of A and B, and the target may comprise C→D.

The training dataset is used to train a GNN using machine learning. The architecture of the GNN may utilize at least the following layers: a permutation equivariant layer (e.g., a message passing layer) to map a representation of the graph into an updated representation of the graph; a local pooling layer that coarsens the graph via down-sampling; and a global pooling layer that provides a fixed-size representation of the whole graph.

The steps in the feature sets, as well as in the targets with which the feature sets are labeled, may be associated with configuration properties. In this case, the GNN will be trained not only to predict the next step, but also to predict the configuration properties of the next step. Thus, when the GNN is applied to a lineage, which may be represented as an adjacency matrix with associated features, including configuration properties of the steps represented in the adjacency matrix, the GNN will output one or more potential next steps, including configuration properties for each of the potential next step(s). Each of the potential next step(s) may also be associated with a confidence value.

In an embodiment, the GNN comprises a graph convolutional network (GCN) that includes one or more convolutional layers. As an example, the GCN may comprise three graph convolutional layers that are each followed by a hyperbolic tangent activation function, and then followed by a four-layer fully-connected feed-forward network. The GCN may be trained using a back-propagation algorithm, such as Back-Propagation Through Time (BPTT).

7. Recurrent Neural Network

In an embodiment, the model that is built and deployed by process 300 may comprise a recurrent neural network (RNN), which is a type of deep neural network that uses sequential data. While traditional deep neural networks treat the inputs and outputs as independent of each other, the output of an RNN depends on prior elements (i.e., steps) within the sequence (i.e., lineage). The RNN may be trained in the same manner as described above with respect to the GNN, using the same training dataset and using BPTT, and may be a graph recurrent neural network (GRNN), which is a specific type of GNNs. The RNN may be trained with Long Short-Term Memory (LSTM) to capture long-term dependencies.

Again, the steps in the feature sets, as well as in the targets with which the feature sets are labeled, may be associated with configuration properties. In this case, the RNN will be trained to not only predict the next step, but also to predict the configuration properties of the next step. Thus, when the RNN is applied to a lineage, which may be represented as an adjacency matrix with associated features, including configuration properties of the steps represented in the adjacency matrix, the RNN will output one or more potential next steps, including configuration properties for each of the potential next step(s). Each of the potential next step(s) may also be associated with a confidence value.

8. Graphical User Interface

Boomi® provides an iPaaS platform that revolutionized the integration/middleware space with a drag-and-drop graphical user interface that eliminates the need for custom code in the construction of integration processes 116. In particular, the graphical user interface comprises a virtual canvas over which a user may drag and drop shapes, representing steps that perform specific functions. Thus, the user may intuitively construct an integration process 116 by simply chaining shapes together (e.g., to automatically synchronize data between software applications 112 used by a business, or automate other repetitive tasks).

Over time, the Boomi® iPaaS platform has grown significantly in functionality and capabilities. However, this increase in functionality and capabilities has also increased the complexity of constructing integration processes 116. The number of available features can be overwhelming to users, and selecting the correct functionality for the correct purpose to build the most optimal integration process 116 still requires significant learning. In addition, application integration is a complex domain that requires some expertise in data object models, APIs, field mappings, error handling, business rules, operation sequences, and best practices of the applications 112. Thus, there is still a learning curve for users to be fully productive in managing their integration platforms 110.

Figure 6:
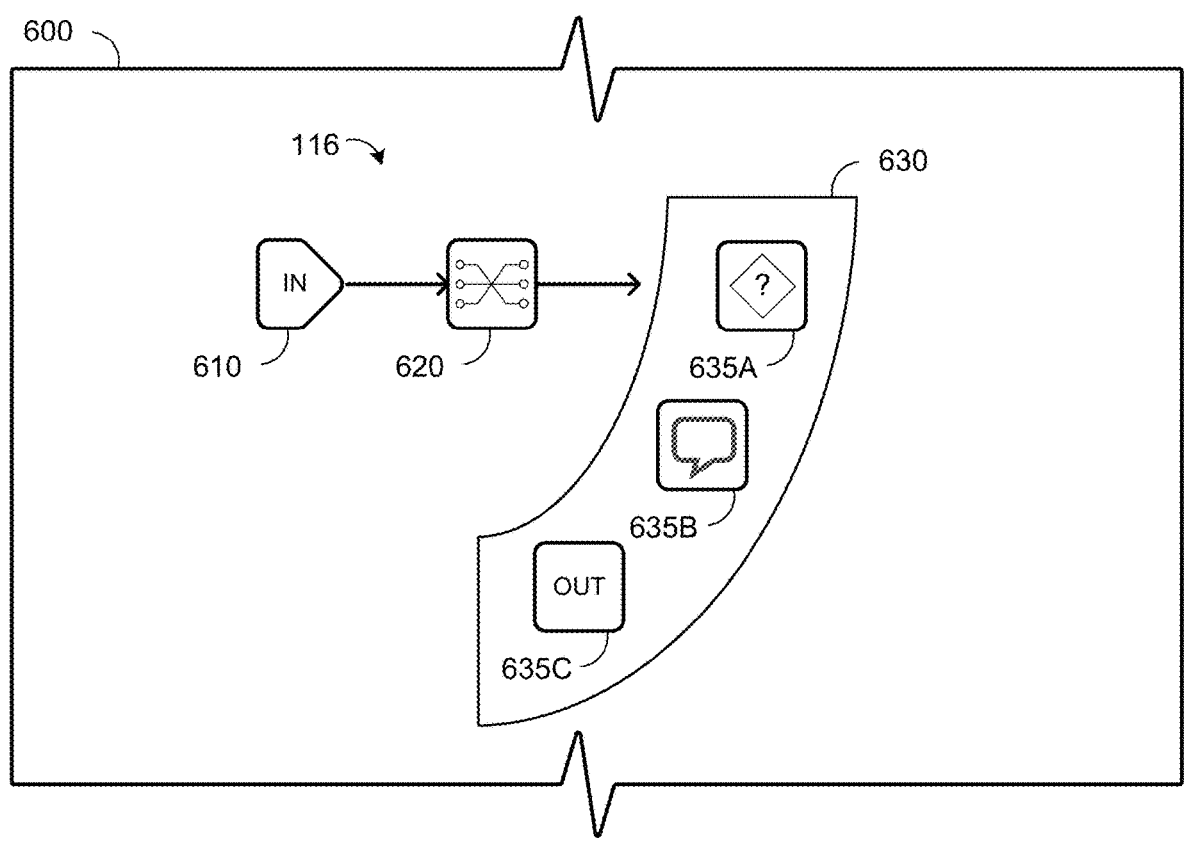
FIG. 6 illustrates an example graphical user interface that may be used to construct an integration process, according to an embodiment.

FIG. 6 illustrates an example graphical user interface that may be used to construct an integration process 116, according to an embodiment. The graphical user interface comprises a virtual canvas 600, which enables a user to drag and drop representations (i.e., "shapes") of steps at positions within an integration process 116 to be constructed. In the illustrated example, the user has already constructed a sequence consisting of a first step 610, followed by a second step 620.

As soon as the user has added second step 620 to integration process 116, the model may be applied to the lineage, consisting of first step 610 followed by second step 620, to predict one or more next steps. For example, the service (e.g., executing in cloud infrastructure 100 or on an external system 140) for constructing integration processes 116, may automatically, in the background, communicate through the API of the microservice, in which the model is wrapped, to input the lineage of 610→620 to the model, and receive a set of one or more potential next steps as the output of the model. The output of the model may identify each potential next step, as well as the confidence value, configuration properties, and/or other characteristics of each potential next step.

In the illustrated example, the model has predicted at least three potential next steps, represented as suggested next steps 635 (e.g., 635A, 635B, and 635C). In an embodiment, the model may output a predefined number of potential next steps (e.g., one, two, three, etc.), along with associated confidence values. In an alternative embodiment, the model may output a confidence value for every available step. For example, the output of the model may be a vector with a dimension that is equal to the number of available steps, and in which every value represents the confidence value of one of the available steps and all of the values sum to one. In this case, a predefined number of steps (e.g., one, two, three, etc.) having the highest confidence values, or any number of steps whose confidence values are above a predefined threshold, may be used as the suggested next steps 635.

Suggested next steps 635 may be displayed according to an order of priority. The order of priority may be defined, for example, by the confidence values, with suggested next steps 635 having higher confidence values prioritized over suggested next steps 635 having lower confidence values. However, additional or alternative criteria may be used for prioritizing suggested next steps 635. In the illustrated example, a frame 630 is displayed with the suggested next step 635A having the highest priority at the top, the suggested step 635B having medium priority in the middle, and the suggested step 635C having the lowest priority at the bottom. In an embodiment, the background of frame 630 may be colorized, for example, to be green at the top, red at the bottom, and fade in the middle from green at the top to red at the bottom. Thus, the priority of each suggested next step 635 may be easily and immediately recognized by the user. It should be understood that the priorities of the suggested next steps 635 may be conveyed in alternative or additional suitable manners, and in an embodiment, may not be conveyed at all.

Although not shown, each suggested next step 635 may be visually represented in association with its respective confidence value. For example, the confidence value, associated with each suggested next step 635, may be displayed near that suggested step 635. Thus, a user can easily determine the relative confidence associated with each suggestion.

A user may view the suggested steps 635 and select one of them and/or drag one of them from frame 630 to a position following second step 620. In response, the graphical user interface may update the visual representation of integration process 116 to add the selected suggested next step 635 as a third step in the current lineage of steps in integration process 116. For example, if the user selects suggested next step 635C, step 635C will be connected to second step 620, to become the third step in the visually represented sequence.

Figure 7:
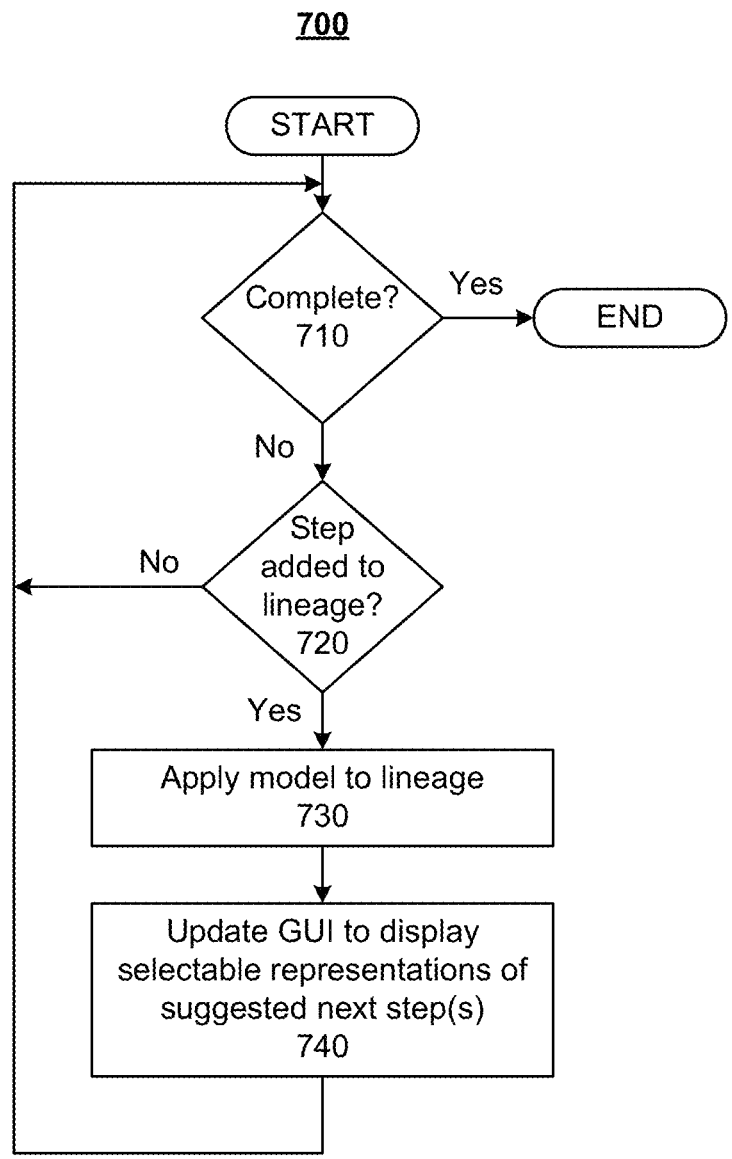
FIG. 7 illustrates an example process for constructing an integration process, according to an embodiment.

FIG. 7 illustrates an example process 700 for constructing an integration process during the operation phase of the model (e.g., built by process 300), according to an embodiment. Process 700 may be implemented as software that is executed in cloud infrastructure 100 or by an external system 140. While process 700 is illustrated with a certain arrangement and ordering of subprocesses, process 700 may be implemented with fewer, more, or different subprocesses and a different arrangement and/or ordering of subprocesses. Furthermore, any subprocess, which does not depend on the completion of another subprocess, may be executed before, after, or in parallel with that other independent subprocess, even if the subprocesses are described or illustrated in a particular order.

In subprocess 710, it is determined whether or not the integration process 116 being constructed is complete. Integration process 116 may be constructed in virtual canvas 600 of a graphical user interface. The user may indicate that the integration process 116 is complete using an input of the graphical user interface. For example, if the user selects the input, it may be determined that the integration process 116 is complete, and until the user selects the input, it may be determined that the integration process 116 is not complete. When it is determined that the integration process 116 is complete (i.e., "Yes" in subprocess 710), process 700 may end. Otherwise, when it is determined that the integration process 116 is not complete (i.e., "No" in subprocess 710), process 700 may proceed to subprocess 720.

In subprocess 720, it is determined whether or not a step has been added to a lineage in the integration process 116. For example, a user may add a step by dragging and dropping a step into a position on virtual canvas 600 to start a new lineage or to connect the step to an existing lineage. Additionally or alternatively, a user may add a step by selecting a suggested next step 635 on virtual canvas 600. When a new step is added to the lineage (i.e., "Yes" in subprocess 720), process 700 may proceed to subprocess 730. Otherwise, until a new step is added to the lineage (i.e., "No" in subprocess 720), process 700 may return to subprocess 710 to await either completion of the integration process 116 or the addition of a new step to the lineage.

In subprocess 730, the model is applied to the current lineage with the added step. As discussed elsewhere herein, the model may be applied automatically in the background whenever a new step is added to the lineage. It should be understood that the current lineage may be transformed into the format that of the model's input. For example, in an embodiment in which the model is Markov chain or a prediction tree 510, the model may be traversed according to the current lineage. In an embodiment in which the model is an artificial neural network (e.g., GNN, RNN, etc.), a feature set may be derived from the current lineage in the same manner as feature sets were derived for the training dataset (e.g., by generating an adjacency matrix with associated features). In any case, the output of the model will be one or more potential next step(s). In an embodiment, each of the potential next step(s) may be associated with a confidence value, configuration properties, and/or other data.

In subprocess 740, the graphical user interface is updated to display a selectable representation of at least one of the potential next step(s) that were output by the model, as suggested next step(s). Depending on the particular design goals, only a single potential next step (e.g., associated with the highest priority) may be represented as a suggested next step, all potential next steps output by the model may be represented as suggested next steps, a predefined number of potential next steps (e.g., associated with the highest priorities) may be represented as suggested next steps, or the like. In an embodiment in which the model outputs a plurality of potential next steps, the potential next steps may be prioritized according to one or more attributes, such as the confidence values output by the model and associated with the potential next steps. In this case, the suggested next steps that are represented in the graphical user interface may be displayed according to their priorities, for example, with suggested next steps having higher confidence values displayed more prominently than any of the suggested next steps having lower confidence values.

A user may select one of the selectable representation(s) of the suggested next step(s) via the graphical user interface. In this case, the selected next step will be added to the current lineage (i.e., "Yes" in subprocess 720). Alternatively, the user could select a different step that is not one of the suggested next step(s) to be added to the lineage. It should be understood that this selection process may continue over a plurality of iterations of process 700, with suggested next steps being visually represented to the user after each addition of a step to the lineage, until the user has created a complete integration process 116.

The selections of steps by users may also be provided as feedback to the model. For example, each selection of a step may be incorporated into a new dataset, each selection of a step that is not a suggested next step may be incorporated into a new dataset, the completed integration process 116 may be incorporated into a new dataset, and/or the like. Periodically, the new dataset, collected during the preceding period, may be used to rebuild, retrain, or otherwise update the model. These updates may be performed automatically (i.e., without user intervention), semi-automatically (e.g., with user confirmation), or manually (e.g., in response to a user operation). It should be understood that, in the new dataset, user selections of next steps may be used for positive reinforcement and user rejections of suggested next steps may be used for negative reinforcement.

9. Example Use Cases

Example use cases for disclosed embodiments will now be described. It should be understood that the described use cases are simply a few examples and are not intended to encompass all possible use cases. Rather, it will be apparent to those skilled in the art how disclosed embodiments may be used and adapted to other contexts and other use cases. In each use case, integration processes 116 that have been implemented in the past by others may be crawled and leveraged to produce a model that facilitates constructions of future integration processes 116.

In a first use case, a new developer or other novice user of an integration platform 110 may desire to construct an integration process 116 to be used in an integration platform 110. The user may start constructing the integration process 116 using a virtual canvas 600 provided in a graphical user interface. Whenever the user adds a step to the current sequence of steps in the integration process 116 (e.g., by dragging and dropping a step onto a position within the virtual canvas or selected a suggested next step), the model may be applied, automatically in the background, to the new lineage of steps to produce a set of one or more suggested next steps. Selectable representations of the suggested next step(s) 635 may then be displayed in the graphical user interface, as discussed elsewhere herein. The user may select one of the suggested next step(s) 635, or the user may drag and drop an entirely different step onto the next position within virtual canvas 600. Thus, the user can build an effective and optimal integration process 116, quickly and efficiently, with little-to-no subject matter expertise and using best practices.

For example, a user may be constructing an integration process 116 to connect an on-premises database to a cloud-based CRM application. The user may start by dragging and dropping an initial step onto the virtual canvas for exporting data from the on-premises database, but may have no idea what the next step should be. The model may be automatically applied to this initial step in the background (i.e., without visibility to the user). Based on crowd-sourced implementations of integration processes 116 that include this initial step, the model may be trained to suggest three potential next steps. Selectable representations of these three potential next steps may be suggested on virtual canvas 600, with the potential next step having the highest confidence value displayed the most prominently (e.g., in terms of position, order, color coding, size, highlighting, and/or the like), and the potential next step having the lowest confidence value displayed the least prominently. The user may select one of these suggested next steps 635, and that suggested next step may responsively be added as the second step in the integration process 116 under construction, or the user may drag and drop the suggested next step onto the next position in the integration process 116 under construction. Once this second step has been connected to the integration process 116 under construction, the model may be automatically applied in the background to this new lineage of steps consisting of the first step followed by the second step, and this process may continue until a full integration process 116 has been completed that connects the on-premises database to the cloud-based CRM application.

In a second use case, pre-built integration processes 116 may be derived from the crowd-sourced implementations of integration processes 116 in the data. For example, if a large number of users (e.g., thirty or more) have all created the same integration process 116, consisting of the same arrangement of the same steps, this is a good indication that the integration process 116 is effective. Thus, such an integration process 116 may be defined as a standards-based template, that may be included in resource metadata associated with lineages representing sub-sequences of the integration process 116, such that the standard-based template will be suggested whenever a user constructs an integration process 116 with the sub-sequence. Alternatively or additionally, the integration process 116 may be packaged for plug-and-play use by other users. For example, the integration process 116 may be provided in a library of available integration processes 116 that is accessible via the graphical user interface. A user may search and/or browse the library, and select an entire integration process 116, instead of having to build a new integration process 116 from scratch.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C,""one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
during a building phase,
collect data from a plurality of integration platforms managed through an integration platform as a service (iPaaS) platform, wherein the data comprise representations of a plurality of integration processes, and wherein each of the plurality of integration processes comprises at least one lineage including a sequence of steps,
generate a dataset comprising representations of the lineages in the plurality of integration processes, and
based on the dataset, build a model that receives a lineage as an input and predicts at least one next step to be added to the input lineage as an output; and
during an operation phase,
generate a graphical user interface comprising one or more inputs for constructing an integration process,
receive a lineage including a sequence of steps from a user via the graphical user interface,
automatically in a background, apply the model to the received lineage to predict at least one potential next step,
display a selectable representation of the at least one potential next step in the graphical user interface, and
in response to selection of the selectable representation of the at least one potential next step by the user, add the at least one potential next step to the sequence of steps in the received lineage.

2. The method of claim 1, wherein each of the plurality of integration platforms is managed by a different organizational account than one or more other ones of the plurality of integration platforms.

3. The method of claim 1, wherein generating the dataset comprises flattening each of the plurality of integration processes, comprising multiple paths, in the collected data, into a plurality of lineages that consist of a single path through the integration process.

4. The method of claim 1, wherein the model comprises a Markov chain.

5. The method of claim 1, wherein the model comprises a prediction tree that comprises branches representing all of the lineages in the dataset.

6. The method of claim 5, wherein the prediction tree is stored as a trie data structure.

7. The method of claim 1, wherein the model comprises an artificial neural network.

8. The method of claim 7, wherein the dataset comprises, for each lineage represented in the dataset, a feature set that comprises an adjacency matrix, representing steps and connections within a first portion of the lineage, and is labeled with at least one next step in a second portion of the lineage.

9. The method of claim 8, wherein, for each lineage represented in the dataset, the feature set further comprises one or more other features associated with the lineage.

10. The method of claim 8, wherein, for each lineage represented in the dataset, the feature set further comprises configuration properties for each step represented in the first portion of the lineage and for the at least one next step in the second portion of the lineage.

11. The method of claim 7, wherein the artificial neural network is a graph neural network.

12. The method of claim 11, wherein the graph neural network is a graph convolutional network.

13. The method of claim 7, wherein the artificial neural network is a recurrent neural network.

14. The method of claim 1, wherein the model predicts a plurality of potential next steps, and wherein the method further comprises using the at least one hardware processor to, during the operation phase, display selectable representations of at least a subset of two or more of the plurality of potential next steps, including the at least one potential next step, in the graphical user interface.

15. The method of claim 14, wherein each of the plurality of potential next steps is associated with a confidence value, and wherein the selectable representations of the at least a subset of two or more potential next steps are displayed according to a priority that is based on the confidence values associated with the two or more potential next steps, such that each of the two or more potential next steps that is associated with a higher confidence value is displayed more prominently than any of the two or more potential next steps that is associated with a lower confidence value.

16. The method of claim 1, further comprising using the at least one hardware processor to:
during the operation phase, collect feedback from the user; and
during a subsequent building phase, update the model based on the collected feedback.

17. The method of claim 1, further comprising using the at least one hardware processor to, after the building phase and prior to the operation phase, deploy the model as a microservice within the iPaaS platform.

18. The method of claim 1, wherein the graphical user interface comprises a virtual canvas on which steps are dragged and dropped to construct the integration process.

19. A system comprising:
at least one hardware processor; and
software that is configured to, when executed by the at least one hardware processor,
during a building phase,
collect data from a plurality of integration platforms managed through an integration platform as a service (iPaaS) platform, wherein the data comprise representations of a plurality of integration processes, and wherein each of the plurality of integration processes comprises at least one lineage including a sequence of steps,
generate a dataset comprising representations of the lineages in the plurality of integration processes, and
based on the dataset, build a model that receives a lineage as an input and predicts at least one next step to be added to the input lineage as an output, and during an operation phase, generate a graphical user interface comprising one or more inputs for constructing an integration process, receive a lineage including a sequence of steps from a user via the graphical user interface, automatically in a background, apply the model to the received lineage to predict at least one potential next step, display a selectable representation of the at least one potential next step in the graphical user interface, and in response to selection of the selectable representation of the at least one potential next step by the user, add the at least one potential next step to the sequence of steps in the received lineage.

20. A non-transitory computer-readable medium having instructions stored therein, wherein the instructions, when executed by a processor, cause the processor to:

during a building phase, collect data from a plurality of integration platforms managed through an integration platform as a service (iPaaS) platform, wherein the data comprise representations of a plurality of integration processes, and wherein each of the plurality of integration processes comprises at least one lineage including a sequence of steps, generate a dataset comprising representations of the lineages in the plurality of integration processes, and based on the dataset, build a model that receives a lineage as an input and predicts at least one next step to be added to the input lineage as an output; and during an operation phase, generate a graphical user interface comprising one or more inputs for constructing an integration process, receive a lineage including a sequence of steps from a user via the graphical user interface, automatically in a background, apply the model to the received lineage to predict at least one potential next step, display a selectable representation of the at least one potential next step in the graphical user interface, and in response to selection of the selectable representation of the at least one potential next step by the user, add the at least one potential next step to the sequence of steps in the received lineage.

\* \* \* \* \*